United States Patent
Karlsson

(10) Patent No.: US 8,630,397 B2
(45) Date of Patent: Jan. 14, 2014

(54) METHOD AND SYSTEM FOR ENABLING CHARGING OF NON-CHARGING CONTROLLED SERVICES

(75) Inventor: Stefan Karlsson, Karlskrona (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1140 days.

(21) Appl. No.: 12/307,396

(22) PCT Filed: Jun. 28, 2007

(86) PCT No.: PCT/SE2007/050472
§ 371 (c)(1),
(2), (4) Date: Jan. 5, 2009

(87) PCT Pub. No.: WO2008/004966
PCT Pub. Date: Jan. 10, 2008

(65) Prior Publication Data
US 2009/0204520 A1    Aug. 13, 2009

(30) Foreign Application Priority Data
Jul. 5, 2006  (EP) ..................................... 06116603

(51) Int. Cl.
*H04M 15/00* (2006.01)

(52) U.S. Cl.
USPC ................... 379/114.03; 379/114.28; 379/126

(58) Field of Classification Search
USPC ............. 379/114.03, 114.05, 114.23, 114.28, 379/121.02, 121.04, 126; 455/405–408
See application file for complete search history.

(56) References Cited

U.S. PATENT DOCUMENTS

| | | | |
|---|---|---|---|
| 7,133,508 B1 * | 11/2006 | Parsa et al. ................ | 379/114.15 |
| 2007/0149202 A1 * | 6/2007 | Mendiratta et al. ........... | 455/445 |
| 2008/0014904 A1 * | 1/2008 | Crimi et al. .................... | 455/406 |

* cited by examiner

Primary Examiner — Quoc D Tran

(57) ABSTRACT

A method and apparatus for charging control of service usage in an electronic communications system. An invocation of charging control is received from a service client for service usage by a user. Charging related data and rules checked for the user and it is determined whether the session should be charging controlled. In case of a non charging controlled session, a response message is returned to the charging client, indicating that the session is not charging controlled and that the service usage is to be reported at the end-of-session. A report of usage is received—from the client—including information of the usage consumed during the session at the end-of-session.

7 Claims, 2 Drawing Sheets

METHOD AND SYSTEM FOR ENABLING CHARGING OF NON-CHARGING CONTROLLED SERVICES

FIELD OF THE INVENTION

The present invention relates generally to a method and apparatus for charging control of service usage in an electronic communications system, and more particularly to a method and apparatus for charging control for reducing signalling for call reports in an electronic communications network, such as a telecommunications network.

DESCRIPTION OF THE PRIOR ART

Charging control of service usage in a communications network, such as a telecommunications network, is provided by an operator/service provider to enforce cost control of a session. The operator/service provider apply charging control which means that it forces the serving client to reserve funds before admitting the user to get any service or consume any good. The charging control will authorize the user to perform the service which has been requested by checking the account status. This check could be against a subscription contract and account status.

The charging control will return a value of how much that could be spent before the client must re-authorize and get a new permission. If the usage for the request is to be unlimited, the charging control will release control and tell the client that charging control is not applicable i.e. that it should continue without charging control.

Charging control is applicable for both postpaid service and prepaid service. In postpaid service, the customer pays for telecommunication service after a period of time, for example a month or quarter. On the other hand, prepaid service requires that a customer pays before the calls are made or another telecommunication service is used. Prepaid services provide immediate service without the need to sign a long-term contract of commitment and it allows better control of spending. Thus, implicit spending control is provided since the customer can never spend more than what is already paid for in advance or use more funds than the allowed credit limit.

In the prior art, for example in the article Mobile Prepaid Phone Service in IEEE Personal Communications June 2000 Volume 7 Issue 3, some approaches are proposed to provide mobile prepaid services. In the hot billing approach, Call Detail Records (CDRs) are used to process prepaid usage. The information in a CDR includes for example type of service, date/time of usage, user identification, destination of the call and location information. These records are generated when the call is completed and are transported from the MSC to the prepaid service center. The customer's prepaid balance is then decremented according to the CDRs.

Another approach is the Intelligent Network solution (IN). In the IN prepaid approach the customer initiates a call by dialling the called party's telephone number. The MSC encounters the IN call set up trigger and suspends the call while contacting the Prepaid Service Control Point (SCP). By querying its associated prepaid database the SCP determines if the call may be allowed or not and if allowed the SCP instructs the MSC to set up the call. The MSC surveys the call according to instructions from the SCP. When the call is ended, either due to depleted credit or call ended by the customer, the MSC informs the SCP about the ended call, the SCP rates the completed call and the customer's account balance is updated accordingly.

Typical prior art systems and methods for charging control use session control protocols based on SS7, e.g. CS1/CS2 and CAMEL application part. These include functions for charging control of sessions. These protocols have a specific operation that supports call reports to be sent from a client to a server after a session, for example after a call is ended. An example of such mechanisms for circuit switched calls are CAMEL Call Information Request that initiates a CAMEL Call Information Report.

The document Annex A: Diameter Credit Control Application, 3GPP TS 32.225 V5.5.0, specifies a Diameter application that is used for real-time cost and credit control between a service element and a credit control server in service environment.

The Diameter Credit Control Application protocol is intended for "active" charging control, i.e. the client asks for funds and then reports back/request new funds when the granted units are spent. However, in the case of a toll-free call, or other free of charge services, the charging server (hereafter called server) would tell the charging client, e.g. an Application Server, (hereafter called client) that charging is not applicable and that the client should continue the service execution without charging control. This result would suppress any new operations to be sent to the server from the client for the service execution.

However, there might be parties apart from the operator that want to charge for an event or service, even though the operator allows the call to be free of charge, e.g. toll free calls to a number outside the operator.

Also, a settlement/accounting process may require transfer of money between the involved parties based on receipts (CDRs). The locally generated receipts will be used in order to check the cost imposed on the operator and to settle eventual disputes.

Further, there might be a need to charge for a service where the charged party is not a subscriber in the charging system but charging should be done externally from the charging system.

Therefore there is a need for a system and method which enables a service which is not charging controlled to be charged, settled or accounted for.

SUMMARY OF THE INVENTION

It is an object of the present invention to provide an improved method and apparatus for charging control reducing signalling for call reports in an electronic communications network, such as a telecommunications network.

According to some embodiments of the invention, there is provided a method for charging control of service usage in an electronic communications system, comprising the steps of: receiving an invocation of charging control from a service client for service usage by a user; checking charging related data and/or rules for the user and determining whether the session should be charging controlled; in case of a non-charging controlled session, returning a response message to the charging client, indicating that the session is not charging controlled and that the service usage is to be reported at the end-of-session; and receiving a report of usage—from the client—including information of the usage consumed during the session at the end-of-session.

A more specific object of the invention is to provide a computer program for working the method.

It should be emphasized that the term "comprises/comprising" when used in this specification is taken to specify the presence of stated features, integers, steps or components but does not preclude the presence or addition of one or more other features, integers, steps, components or groups thereof.

Further embodiments are defined by the dependent claims.

BRIEF DESCRIPTION OF THE DRAWINGS

In order to explain the invention and the advantages and features thereof in more detail the preferred embodiments will be described below, references being made to the accompanying drawings, in which.

DETAILED DESCRIPTION OF THE INVENTION

Figure 1:
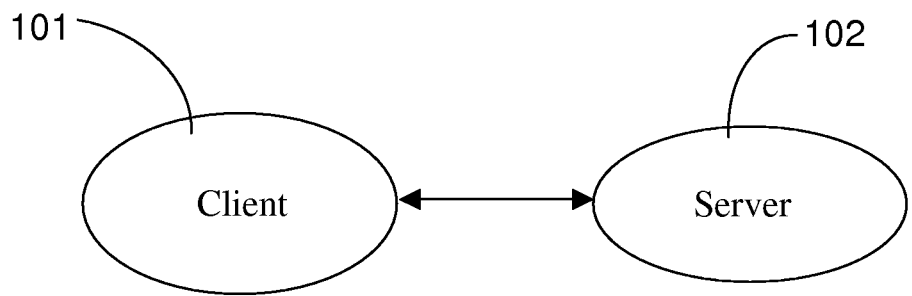
FIG. 1 is a schematic view of a client/server architecture for charging control of service usage in a communications system.

FIG. 1 illustrates a client/server architecture for charging control of service usage in a communications system. The client/server architecture includes means for generating a call report even when charging control is generally not applicable. The client/server architecture is a relationship between two computer programs in which one program, the client 101, makes a service request from another program, the server 102, which fulfils the request. According to some embodiments of the invention, the client/server architecture is configured in a network, wherein the client/server provides a way to interconnect programs that are distributed among computer apparatuses across different locations. In a charging scenario the client is the system executing the user service or at least controlling the session or service delivery. The client requests permission from the server regarding the payment ability of the party to be debited. Examples of clients are, but is not limited to, a GSM Service Switching Function (gsmSSF) for CAMEL Prepaid voice calls, a GPRS Service Switching Function (gprsSSF) for GPRS data traffic and IP Multimedia Service (IMS) Switching Function (IM-SSF) for IMS or an application server for internet content services.

Hence, the client/server architecture may comprise a digital electronic computer or computer apparatus and processes performed in computer apparatus. The computer apparatus or system may be used in a telecommunications network and may comprises a data processing system, including a computer processor for processing data, and storage means connected to the computer processor for storing data on a storage medium.

Figure 2:
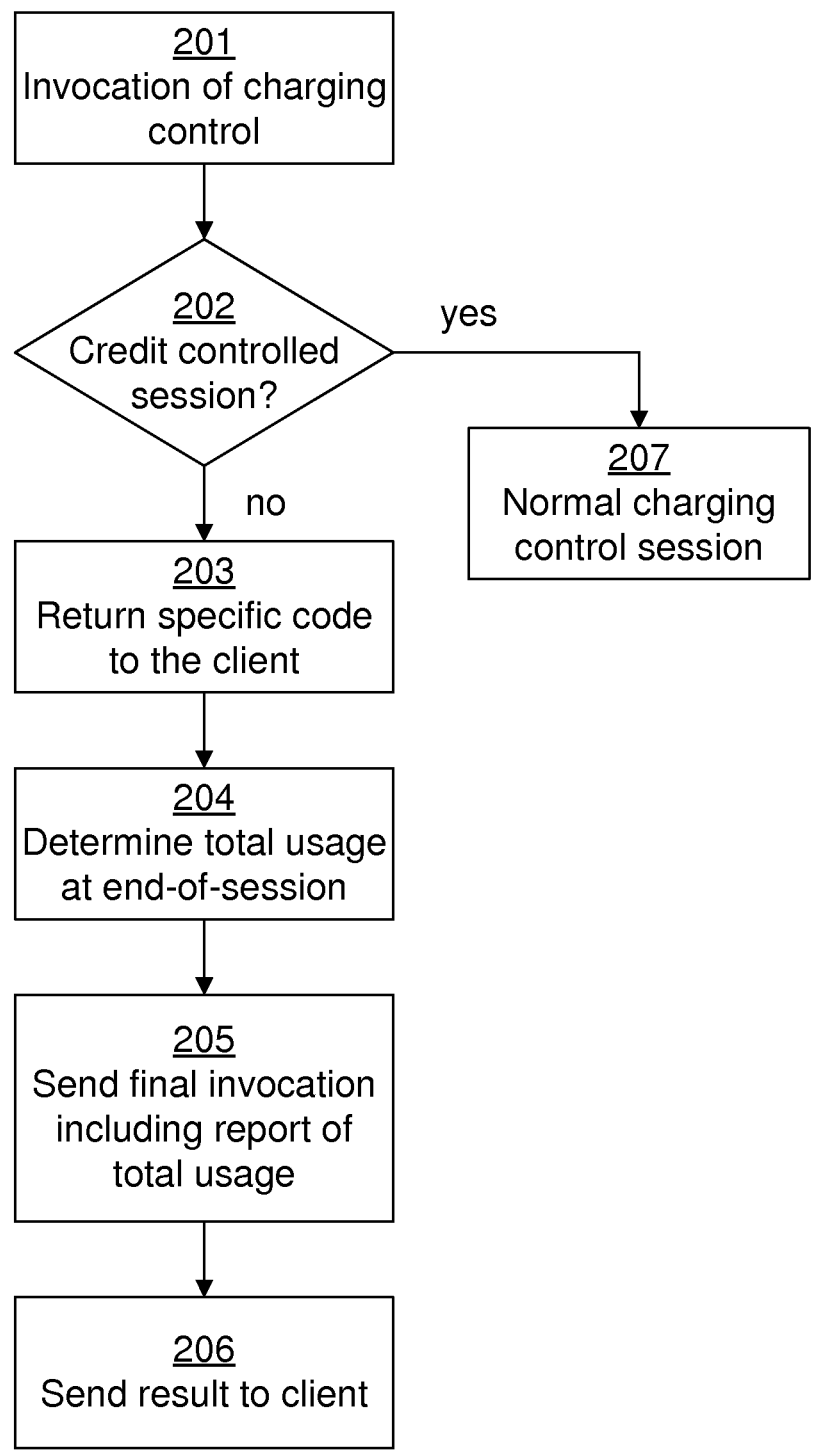
FIG. 2 is a flow chart of a method for charging control including the steps of generating a call report even when charging control is generally not applicable.

Referring to FIG. 2 in the drawings, there is shown a flowchart illustrating a method for charging control including the steps of generating a call report even when charging control is generally not applicable according to some embodiments of the invention. The method according to the invention may be run as a computer program in a client/server architecture as described in connection with FIG. 1.

The client contacts the server for invocation of charging control in step 201 in order to get the session authorized by the charging server.

The invocation may include an amount of requested usage for chargeable services. Nevertheless, the server checks the charging related data and/or rules, if the client's contract allows the usage in step 202. Prior to step 202, it might be checked whether it is a local subscriber, i.e. a subscriber stored in this charging system, or a CDR (Call Detail Record) is to be generated for later processing.

In case of a non-charging controlled session, i.e a session free of charge, e.g. a toll free call to a number outside the operator, a response message or a specific result code is returned from the server to the client, in step 203, including information for the client that the service usage is to be reported at the end-of-session. The session is setup and the total usage is determined in response to the code when the session is terminated, for example by a request from the client, in step 204. The client sends a final invocation of charging control—to the server—including a report with information of the total usage consumed during the full session at the end-of-session in step 205. The information may be analysed by the server before an acknowledgement is sent to the client in step 206. The usage information of the (final) report is further reported to a second charging or billing system.

The response message may comprises a CAMEL Call Information Request operation and the report with information of the total usage may be a CAMEL Call Information Report operation or a INAP CS1/INAP CS2 Call Information Request operation, and the report with information of the total usage may be an INAP CS1/INAP CS2 Call Information Report operation.

The response message and the report may also be new or modified DIAMETER operations.

The consumed usage may be further reported to a third party for charging.

However, in case of a chargeable event or service it may be checked whether the cost of at least a part of the session is covered by the users funds (including credits) in step 202. The amount corresponding to at least the cost of this part is then reserved on the account for the session followed by the steps of charging control of the session illustrated by a multi step 207 in FIG. 2.

The multi step 207 may include the following steps. The server returns a result, with the amount of (granted) units that could be consumed before the client needs to stop the user processing and ask for a new reservation. This result may include an indication that after this authorization no more usage will be allowed in this session. The client should then send a final invocation when the client has spent all granted units received in the operation.

When the granted units are used up the client makes an intermediate invocation, thereby asking for a new credit authorization, including the units used after the previous invocation (reservation). The server deducts the units used from the reservation and makes any unused amount available for new reservations.

A new authorization is made in the same way as for the initial check. The result, which may include new (granted) units that could be spent before the server needs to be contacted again, is sent back to the client. As with the first invocation result, the result could contain an indication that the granted units were the final.

The intermediate invocation followed by a result code including granted units may be repeated.

The final invocation is made if either the session is terminated by the client, final units are received in the previous result, or that the session is terminated by other reasons including user initiated termination. Hence, the steps of intermediate invocation followed by a result code including granted units are optional steps.

The used units are deducted from the reservation and any unused units are made available for further usage. Normally a receipt is output by the server and a result is sent back to the client.

As shown, this system may implement a charging solution by utilizing the well known Diameter protocol (see IETF RFC 3588 "DIAMETER") to authenticate subscribers, authorize service and charge the subscriber. Basically, the Diameter protocol provides an Authentication, Authorization and Accounting (AAA) framework for applications such as network access or IP mobility. The Diameter base protocol also provides the minimum requirements needed for a AAA protocol. The base protocol may be used by itself for accounting purposes only, or it may be used with a Diameter application.

However, the accounting part of the RADIUS/Diameter protocol is not an online interface which means that a service can not be rated and the subscriber can not be charged before they access the service. Hence, the subscriber cannot use a real time prepaid solution so they can pay in advance for a service and then later access and use a particular service. A Diameter Credit Control (DCC) Application (see IETF RFC 4006) has been implemented to address this problem to enable the online credit control for a subscriber.

Although the embodiments of the invention described with reference to the drawings comprise computer apparatus and processes performed in computer apparatus, the invention also extends to programs on or in a carrier, adapted for putting the invention into practice. The program may be in the form of source code, object code a code suitable for use in the implementation of the method according to the invention. The carrier can be any entity or device capable of carrying the program. For example the carrier may be a record medium, computer memory, read-only memory or an electrical carrier signal. Embodiments according to the invention may be carried out when the computer program product is loaded and run in a system having computer capabilities.

The invention claimed is:

1. A method for charging control of service usage in an electronic communications system, comprising the steps of:
   receiving a first invocation of charging control from a client for service usage by a user;
   determining whether the session should be charging controlled based on one or more of char related data and rules for the user;
   in case of a session free of charge, returning a response message to the client, indicating that the session is free of charge and that the service usage is to be reported at the end-of-session;
   receiving, from the client at the end-of-session a final invocation of charging control, the final invocation including a report of usage including information of the usage consumed during the session; and
   analyzing the information and sending an acknowledgement to the client.

2. A method according to claim 1, wherein the response message comprises a CAMEL Call Information Request operation and the report is a CAMEL Call Information Report operation, or the response message comprises an INAP CS1/INAP CS2 Call Information Request operation and the report is an INAP CS1/INAP CS2 Call Information Report operation.

3. A method according to claim 1, wherein the response message and the report are new or modified DIAMETER operations.

4. A method according to claim 1 wherein said consumed usage is further reported to a third party for charging.

5. A computer program product comprising a computer readable medium, having thereon: computer program code configured, when said program is loaded, to make the computer execute a process comprising:
   receiving a first invocation of charging control from a client for service usage by a user;
   determining whether the session should be charging controlled based on one or more of charging related data and rules for the user;
   in case of a session free of charge, returning a response message to the client, indicating that the session is free of charge and that the service usage is to be reported at the end-of-session;
   receiving, from the client at the end-of-session, a final invocation of charging control, the final invocation including a report of usage including information of the usage consumed during the session; and
   analyzing the information and sending an acknowledgement to the client.

6. A programmable apparatus for charging control of service usage in an electronic communications system configured to:
   invoke charging control of a toll free session from a server;
   receive a specific result code from the server including information that the service usage is to be reported at the end-of-session;
   determine the final usage at the end-of-session;
   send a final invocation of charging control to the server including a report with information of the total usage consumed during the full session at the end-of-session; and
   receiving an acknowledgement from the server.

7. A programmable apparatus for charging control of service usage in an electronic communications system configured to:
   receive a first invocation of charging control from a client;
   determine whether the session is toll free based on charging related data and rules for the client;
   in case of a toll free session, return a specific result code to the client, including information for the client that the service usage is to be reported at the end-of-session;
   receive, from the client at the end-of-session, a final invocation of charging control including a report with information of the total usage consumed during the full session; and
   analyze the information and send an acknowledgement the client.

* * * * *